United States Patent Office 2,974,141
Patented Mar. 7, 1961

2,974,141

P-(2-PYRAZOLIN-1-YL) STYRYL DYES

Arnold F. Plue, Albany, N.Y., assignor to General Aniline & Film Corporation, New York, N.Y., a corporation of Delaware No Drawing. Filed Dec. 17, 1958, Ser. No. 780,916

6 Claims. (Cl. 260—249.9)

This invention relates to a new class of styryl dyes which dye synthetic fibres with good wash and light fastness, are brilliant in color and may also be employed as photographic sensitizers.

It is known that 1,3,3-trimethyl-2-methyleneindoline can be condensed with either a p-dialkylamino benzaldehyde, p-(N-methyl-N-chloroethyl-amino) benzaldehyde, and various other dialkyl substituted amino benzaldehydes to yield styryl dyes which generally possess sensitizing action and as a consequence can be employed in sensitizing silver halide emulsions. Such dyes however are poor in light and wash fastness.

It is the principal object of the present invention to provide a new class of p-(2-pyrazolin-1-yl) styryl dyes which can be employed in sensitizing photographic silver halide emulsions and to dye synthetic fibres of brilliant color, good wash and light fastness.

Other objects and advantages will become more clearly manifest from the following description.

I have found by condensing 1,3,3-trimethyl-2-methylene-indoline with a p-(3,5-disubstituted or 3,5,5-trisubstituted 2-pyrazolin-1-yl) benzaldehyde in the presence of an acid condensing agent, new styryl dyes are obtained which are not only of high tinctorial strength and of good light and wash fastness, but also because of their brilliance are particularly adaptable for dyeing the currently available synthetic fibres, such as Acrilan, Orlon 42, etc.

These p-(2-pyrazolin-1-yl) styryl dyes are characterized by the following general formula:

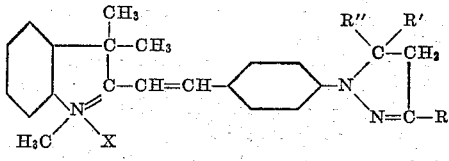

wherein R and R' represent an alkyl, e.g., methyl, ethyl, propyl, butyl; aryl, e.g., phenyl or naphthyl, both the alkyl and aryl groups being unsubstituted or substituted by halogen, i.e. chloro or bromo, by nitro, by lower alkoxy, e.g., methoxy or ethoxy; by dialkylamino, e.g., dimethyl- or diethyl-amino-; by cyano, sulfonamido, methyl sulfonamido, dimethyl sulfonamido, morpholino, piperidino, R" represents either hydrogen or a substituted or unsubstituted alkyl or aryl group of the same value as in R and R', and X represents an anion such as chlorine, bromine, iodine, sulfate, phosphate, borate, or any other salt forming group or radical.

The styryl dyes of the present invention are readily obtained by condensing 1 mole or a slight excess thereof of 1,3,3-trimethyl-2-methyleneindoline with 1 mole or a slight excess of a p-(3,5-disubstituted or 3,5,5-trisubstituted 2-pyrazolin-1-yl) benzaldehyde in the presence of an acidic condensing agent, such as glacial acetic acid, at a temperature ranging between 90–120° C. The time of reaction may range from 1 hour to 5 hours. After the reaction has been completed the product is isolated by dilution with or drowning into water containing at least 1 molar equivalent of an anion, such as hydrochloric acid, sodium chloride, sulfuric acid, sodium sulfate, phosphoric acid, sodium phosphate, hydrogen iodide or sodium iodide, hydrobromic acid or sodium bromide, and the like. For example, if the product is to be isolated as the chloride the water used for isolation or drowning contains a slight excess over 1 mole of hydrochloric acid or excess over 1 mole of sodium chloride, or an excess containing both sodium chloride and hydrochloric acid. It is to be understood however, that the product can also be precipitated in a similar manner as the iodide, bromide, sulfate, phosphate, by employing the proper anion.

As examples of p-(3,5-disubstituted and 3,5,5-trisubstituted 2-pyrazolin-1-yl) benzaldehydes which are characterized by the following general formula

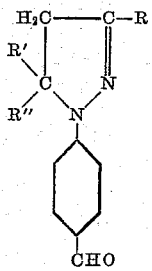

wherein R, R' and R" have the same value as the above, the following are illustrative:

p-(3-methyl-5-[α-(4-methoxynaphthyl)]-2 - pyrazolin - 1-yl)benzaldehyde
p-(3,5-diphenyl-2-pyrazolin-1-yl)benzaldehyde
p-(3,5-diphenyl-5-methyl-2 - pyrazolin - 1 - yl)benzaldehyde
p-(3-methyl-5-phenyl-2-pyrazolin-1-yl)benzaldehyde
p-(3,5,5-trimethyl-2-pyrazolin-1-yl)benzaldehyde
p-[5-(p-dimethylaminophenyl)3-phenyl - 2 - pyrazolin-1-yl]benzaldehyde
p-[3-(2-naphthyl)-5-phenyl - 2 - pyrazolin-1-yl]benzaldehyde
p-[5-(p-anisyl)-3-(2-naphthyl) - 5 - phenyl-2-pyrazolin-1-yl]benzaldehyde
p-[3,5-di(p-anisyl)-2-pyrazolin-1-yl]benzaldehyde
p-[3-(p-dimethylaminophenyl) - 5 - phenyl-2-pyrazolin-1-yl]benzaldehyde
p-[5-(p-anisyl)-3-phenyl - 2 - pyrazolin - 1-yl]benzaldehyde
p-[3-(p-anisyl)-5-phenyl - 2 - pyrazolin - 1-yl]benzaldehyde
p-(3,5,5-triethyl-2-pyrazolin-1-yl)benzaldehyde
p-[3-(2-chloroethyl)-5,5 - dimethyl - 2 - pyrazolin-1-yl]benzaldehyde
p-[3-(2-cyanoethyl) - 5 - methyl-2-pyrazolin-1-yl]benzaldehyde
p-[3-(2-dimethylaminoethyl) - 5 - dimethyl-5-methyl-2-pyrazolin-1-yl]benzaldehyde
p-(3,5-diphenyl - 5 - methyl-2-pyrazolin-1-yl)benzaldehyde
p-[5-(p-dimethylsulfamylphenyl) - 3 - phenyl-2-pyrazolin-1-yl]benzaldehyde
p-[3-phenyl - 5 - (p-sulfamylphenyl) - 2-pyrazolin-1-yl]benzaldehyde
p-[5-(p-methylsulfamylphenyl) - 3 - phenyl-2-pyrazolin-1-yl]benzaldehyde
p-(3,5,5-triphenyl-2-pyrazolin-1-yl)benzaldehyde
p-[3-(p-dimethylsulfamylphenyl) - 5 - phenyl-2-pyrazolin-1-yl]benzaldehyde
p-[5-(m-chlorophenyl)-3-phenyl - 2 - pyrazolin - 1 - yl]benzaldehyde
p-[5-(m-nitrophenyl) - 3 - phenyl - 2 - pyrazolin-1-yl]benzaldehyde p-[3-(1-naphthyl) - 5 - phenyl-2-pyrazolin-1-yl]benzaldehyde p-[5-(p-morpholinosulfonylphenyl) - 3 - phenyl-2-pyrazolin-1-yl]benzaldehyde p-[3-phenyl-5-(p-piperidinosulfonylphenyl) - 2-pyrazolin-1-yl]benzaldehyde All of the foregoing aldehydes are readily prepared by formylation of the corresponding 3,5-disubstituted and 3,5,5-trisubstituted-1-phenyl-2-pyrazolines as disclosed and claimed in my application, Serial No. 780,956, filed on even date herewith, the complete disclosure and teachings of which are incorporated herein by reference thereto.

The following examples will describe the preparation of the new class of styryl dyes characterized by the foregoing general formula. It is to be understood that these examples are merely illustrative and that the invention claimed herein is not to be regarded as restricted thereto.

EXAMPLE I

To 40 cc. of glacial acetic acid were added 8.7 grams of 1,3,3-trimethyl-2-methyleneindoline and 17.0 grams of p - (3,5 - diphenyl - 5 - methyl - 2 - pyrazolin - 1 - yl)-benzaldehyde. The charge was heated for 3 hours at 95–100° C. 25 cc. of concentrated hydrochloric acid were added and the charge slowly poured into 1500 cc. of water. 60 grams of sodium chloride were added. The product was filtered, washed with water and dried, giving a pulverulent product having a blue-violet color.

A further purification of the resulting chloride dye was made by extracting with hot benzene and filtering, then recrystallizing from methyl alcohol.

EXAMPLE II 10 grams of the non-purified product of Example I were dissolved in methyl alcohol, then poured in 1 liter of water containing 25 cc. of aqueous sodium hydroxide 40% by vol. It was stirred for 15 minutes, filtered and washed with water. It was then dissolved in 50 cc. of acetic acid and poured into a mixture of 1000 cc. of water and 10 grams of potassium iodide, stirred 1 hour, filtered, washed with water and dried. The iodide dye was recrystallized from methyl alcohol.

The analyses for percent nitrogen and iodine obtained were within the limits of experimental error for the iodide derived from a dye having the formula of the dye of Example I shown in claim 2.

EXAMPLE III

To 50 cc. of glacial acetic acid were added 8.7 grams of 1,3,3-trimethyl-2-methylene indoline and 12.5 grams of p - (3-methyl-5-phenyl-2-pyrazolin-1-yl)benzaldehyde. The mixture was heated to 95–100° C. for 1 hour and then poured into a mixture of 1000 cc. of water and 20 cc. concentrated hydrochloric acid. It was then stirred for 1 hour, filtered, washed and dried.

Purification was accomplished by extraction with hot benzene, filtering, dissolving in isopropanol, filtering, precipitating by pouring into water acidified with hydrochloric acid, filtering and washing.

The dye was converted into the iodide in the manner similar to Example II. Nitrogen and iodine analysis indicates the percentage to be within the limits of experimental error for the iodide prepared from the dye of the formula shown in claim 3.

EXAMPLE IV 6.5 grams of p-(3,5,5-trimethyl-2-pyrazolin-1-yl)benzaldehyde, 5.2 grams of 1,3,3-trimethyl-2-methylene indoline and 10 cc. of glacial acetic acid were mixed and heated on a boiling water bath for 2 hours. To this was added 20 cc. of hydrochloric acid. The reaction mixture was poured into 100 cc. of water and 100 cc. of saturated sodium chloride solution added. After standing until precipitation appeared complete, the charge was then filtered and dried.

Additional purification was effected as in Example I.

To convert to the iodide, the dye was dissolved in 50 cc. of glacial acetic acid and added to a solution of 10 grams of potassium iodide dissolved in water. It was then diluted with cold water, filtered and recrystallized from methyl alcohol.

An iodine and nitrogen analysis is within the limits of experimental error for the iodide prepared from the dye of the formula shown in claim 4.

EXAMPLE V 5.3 grams of p-[5-(p-dimethylaminophenyl)-3-phenyl-2-pyrazolin-1-yl]benzaldehyde, 2.6 grams of 1,3,3-trimethyl-2-methylene indoline and 10 cc. of glacial acetic acid were mixed and heated on a boiling water bath for 2 hours. 10 cc. of hydrochloric acid were added and the charge poured into a mixture of 200 cc. of water and 50 cc. of saturated salt solution. It was heated to the boil and cooled, filtered and dried.

Purification was effected as in Example I.

EXAMPLE VI 7.5 grams of p-[3-(2-naphthyl)-5-phenyl-2-pyrazolin-1-yl]benzaldehyde, 4.0 grams of 1,3,3-trimethyl-2-methylene indoline and 75 cc. of glacial acetic acid were mixed and heated to 95–120° C. for 4 hours. 10 cc. of concentrated hydrochloric acid were added and the charge poured into 500 cc. of water followed by 25 cc. of hydrochloric acid. It was then stirred for 1 hour, filtered, washed with water and dried.

In purifying, it was extracted with hot benzene, forming a gum. After decanting off the benzene it was dissolved in a few cc. of hot isopropanol, diluted to 200 cc. with hot benzene and cooled. It was then filtered and washed with benzene. Bronzy crystals resulted.

The chloride was converted to the iodide in the same manner as in Example II.

EXAMPLE VII 10.15 grams of p-[5-(p-anisyl)-3-(2-naphthyl)-5-phenyl-2-pyrazolin-1-yl]benzaldehyde, 4.5 grams of 1,3,3-trimethyl-2-methylene indoline and 25 cc. of glacial acetic acid were mixed and heated for 5 hours at 95–100° C. 10 cc. of concentrated hydrochloric acid were added and the charge poured into 500 cc. of water. The resulting precipitate was filtered, washed with water and dried.

Purification was accomplished by solution in 200 cc. of equal parts of methyl alcohol and water, clarification over Celite (a diatomaceous earth), addition of 100 cc. more of water, heating, slowing cooling, filtering, washing and drying.

The product was converted to the iodide according to the method of Example II. Nitrogen and iodine analysis were within the limits of experimental error for the iodide prepared from the dye of the formula shown in claim 5.

In a manner corresponding to the foregoing examples, various p-(3,5-disubstituted and 3,5,5-trisubstituted 2-pyrazolin-1-yl)benzaldehydes were condensed with 1,3,3-trimethyl-2-methylene indoline to yield styryl dyes of the above general formula wherein R, R′ and R″ have the following values:

*Styryl dye*

| Example | R | R′ | R″ |
| --- | --- | --- | --- |
| 8 | $C_6H_5$— | $C_6H_5$— | H |
| 9 | p-$CH_3OC_6H_4$— | p-$CH_3OC_6H_4$— | H |
| 10 | $C_6H_5$— | p-$CH_3O$—$C_6H_4$— | H |
| 11 | p-$CH_3OC_6H_4$— | $C_6H_5$— | H |
| 12 | p-$(CN_3)_2N$—$C_6H_4$— | $C_6H_5$— | H |

EXAMPLE XIII 100 grams of "Orlon 42" cloth were dyed in a dyebath containing a mixture of 0.75 gram of the styryl dye of Example I and 0.75 gram of dextrin, 0.3 gram of sodium acetate, 1.0 gram of 28% aqueous acetic acid in 100 cc. of water for 1 hour at the boil. The material was removed, rinsed and dried. It was dyed in a violet shade having good wash and light fastness.

When "Orlon 42" cloth was dyed in the same manner as above with the styryl dyes of Examples III to VII inclusive, in the form of their chlorides, the following shades of good wash and light fastness were obtained:

"Orlon 42" cloth

Dyed with styryl dyes
of examples:                                Shade
3 ........................................ Red-violet
4 ........................................ Red-violet
5 ........................................ Blue-violet
6 ........................................ Blue-violet
7 ........................................ Blue-violet

EXAMPLE XIV 100 grams of "Acrilan" cloth were dyed in a dyebath which contained a mixture of 0.75 gram of the dye of Example I and 0.75 gram of dextrin, 5.0 grams of ammonium acetate, 0.5 gram of a dispersing agent prepared by condensing 1 mole of nonyl diphenol with 15 moles of ethylene oxide in 100 cc. of water for 1 hour at the boil. The cloth was dyed in a brilliant violet shade having excellent light and wash fastness. When "Acrilan" cloth was dyed in the same manner while utilizing the dyes of Examples VIII to XII in the form of their chlorides, the following shades of excellent light and wash fastness were obtained:

"Acrilan" cloth

Dyed with Styryl dyes
of examples:                                Shade
8 ........................................ Violet
9 ........................................ Blue-violet
10 ....................................... Blue-violet
11 ....................................... Blue-violet
12 ....................................... Blue-violet

EXAMPLE XV

Example XIII was repeated with the exception that styryl dyes of Examples VIII to XII were employed in the form of their chlorides, as the dyeing medium. The dyed "Orlon 42" cloth which possessed excellent light and wash fastness showed the following shades:

Dyes of example:                            Shade
8 ........................................ Violet
9 ........................................ Blue-violet
10 ....................................... Blue-violet
11 ....................................... Blue-violet
12 ....................................... Blue-violet It is to be clearly understood that by the designation alkyl and aryl as values for R, R' and R", I intend to include not only the unsubstituted alkyl and aryl groups but their substitution products as specifically recited hereinabove.

I claim:
1. The styryl dye of the formula:

wherein R and R' represent a member selected from the class consisting of lower alkyl, phenyl and naphthyl groups and these mono-substituted by a member selected from the class consisting of halogen, lower alkoxy, lower dialkylamino, nitro, cyano, sulfonamido, methyl sulfonamido, dimethyl sulfonamido, morpholino and piperidino, R" represents a member selected from the class consisting of hydrogen R and R', and X represents an inorganic anion suitable for dyeing.

2. The styryl dye of the formula:

3. The styryl dye of the formula:

4. The styryl dye of the formula:

5. The styryl dye of the formula:

6. The styryl dye of the formula:

References Cited in the file of this patent
UNITED STATES PATENTS
2,772,943    Hiller ................ Dec. 4, 1956

OTHER REFERENCES

Lubs: The Chemistry of Synthetic Dyes and Pigments, p. 250, ACS Monograph No. 127, Reinhold Publishing Corp. (1955).

Venkataraman: The Chemistry of Synthetic Dyes, vol. II, pp. 1173–1175, Academic Press Inc. (1952).

Rasburn et al.: J. Chem. Soc. (1957), pp. 2237–2239.